United States Patent [19]
Boisseau

[11] 3,937,275
[45] Feb. 10, 1976

[54] SYSTEM FOR THERMAL EXCHANGERS
[76] Inventor: Bernard Boisseau, 20 rue de l'Oisillonnette, 49 Cholet, France
[22] Filed: May 21, 1973
[21] Appl. No.: 362,271

[30] Foreign Application Priority Data
May 24, 1972 France .............................. 72.19609

[52] U.S. Cl. ...................... 165/85; 165/50; 236/64; 237/56; 237/66
[51] Int. Cl.² ......................................... F24H 3/02
[58] Field of Search ............ 165/85, 50; 237/66, 56, 237/59, 57, 68; 236/64; 55/39, 159

[56] References Cited
UNITED STATES PATENTS

| | | | |
|---|---|---|---|
| 1,198,918 | 9/1916 | Holmberg | 236/64 |
| 2,115,706 | 5/1938 | Cornell | 165/85 |
| 2,220,754 | 11/1940 | Cornell | 165/85 |
| 2,652,069 | 9/1953 | Goheen | 237/56 |
| 3,371,504 | 3/1968 | Brindley | 165/85 |
| 3,425,485 | 2/1969 | Newton | 165/50 |
| 3,667,864 | 6/1972 | Murphy | 165/85 |

FOREIGN PATENTS OR APPLICATIONS

| | | | |
|---|---|---|---|
| 391,207 | 8/1908 | France | 237/56 |
| 1,128,034 | 8/1956 | France | 237/66 |
| 678,179 | 12/1929 | France | 237/56 |
| 1,458,681 | 10/1966 | France | 237/66 |
| 617,937 | 11/1926 | France | 237/66 |

Primary Examiner—Charles J. Myhre
Assistant Examiner—Daniel J. O'Connor
Attorney, Agent, or Firm—Raymond A. Robic; Francis B. Francois; Arthur Schwartz

[57] ABSTRACT

A thermal distribution system for distributing heated or cooled fluid from respective fluid generators to thermal exchangers. The system comprises a regulating-reversing device for selectively controlling and distributing the fluid from and towards the hot fluid generator and the cold fluid generator, and regulating the flow thereof from and towards the thermal exchangers. A degasifying device is connected to the regulating-reversing device for distributing said fluid to the exchangers and for collecting the same from said exchangers. A pumping means is mounted between said degasifying device and said regulating-reversing device for pumping the fluid from the latter to the former.

6 Claims, 13 Drawing Figures

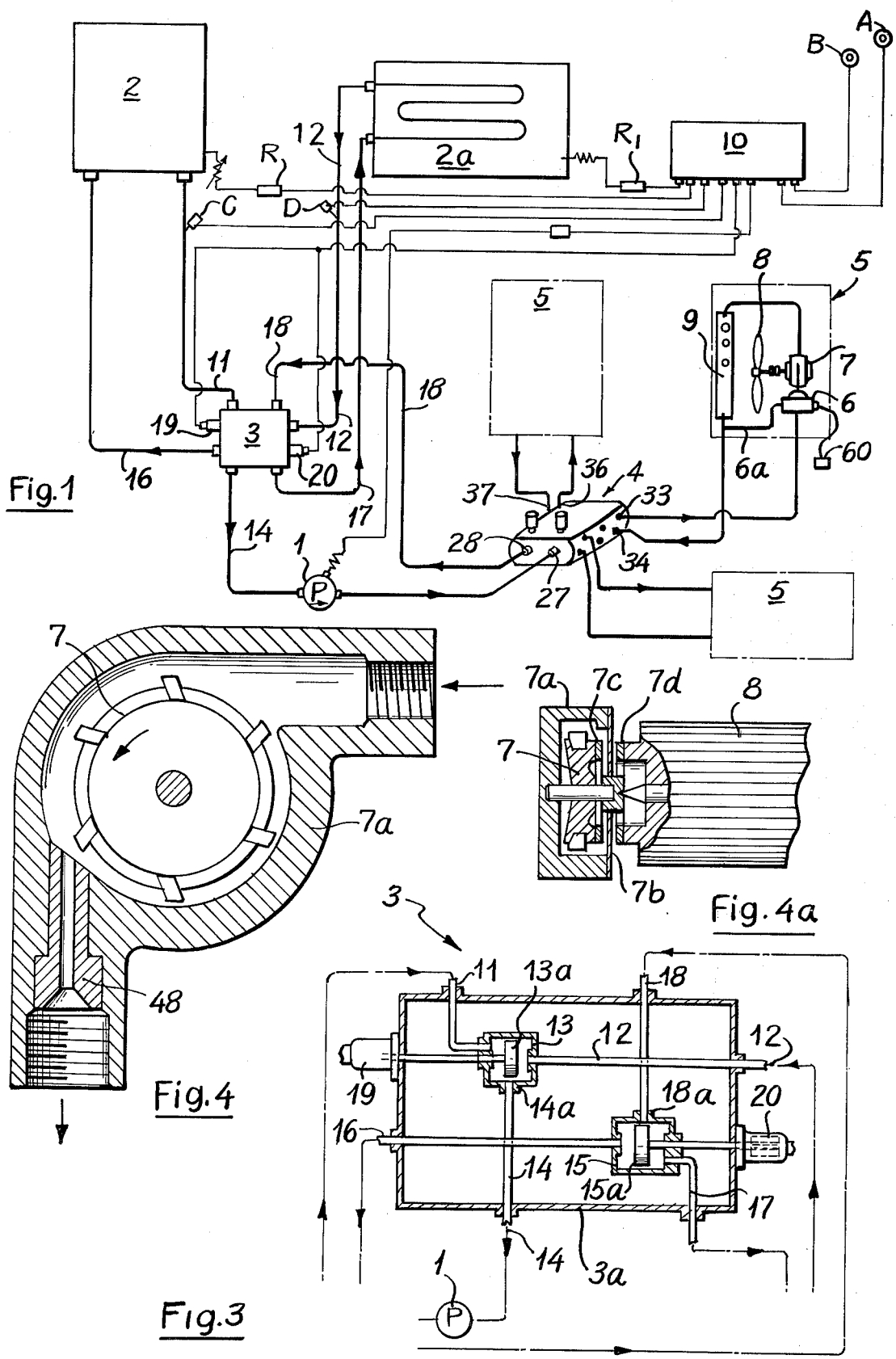

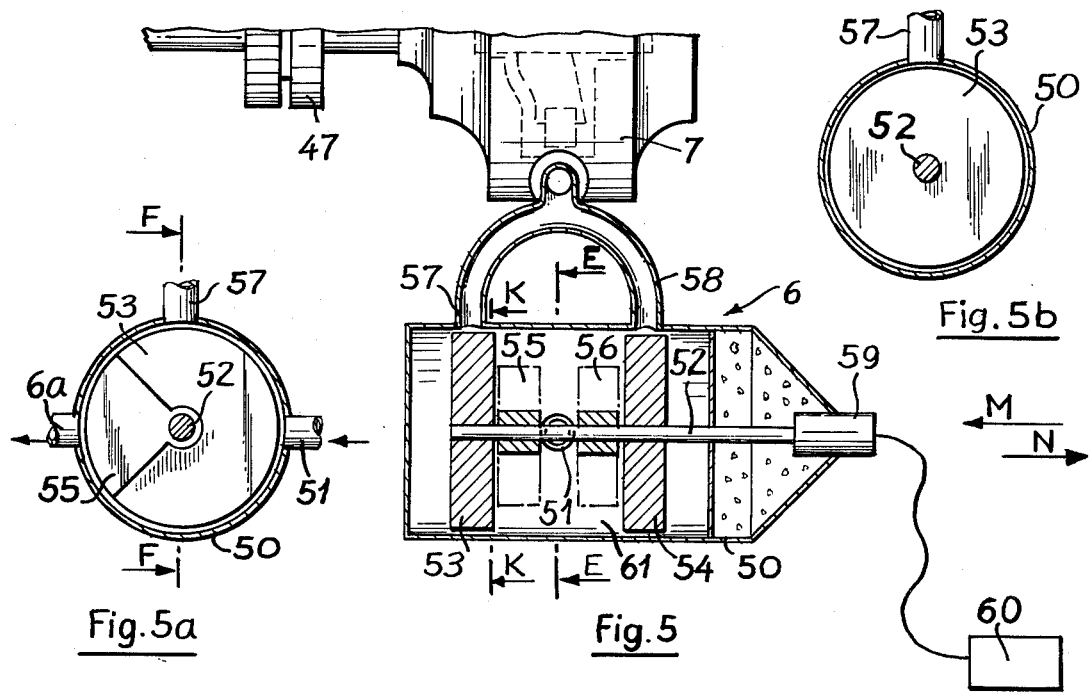
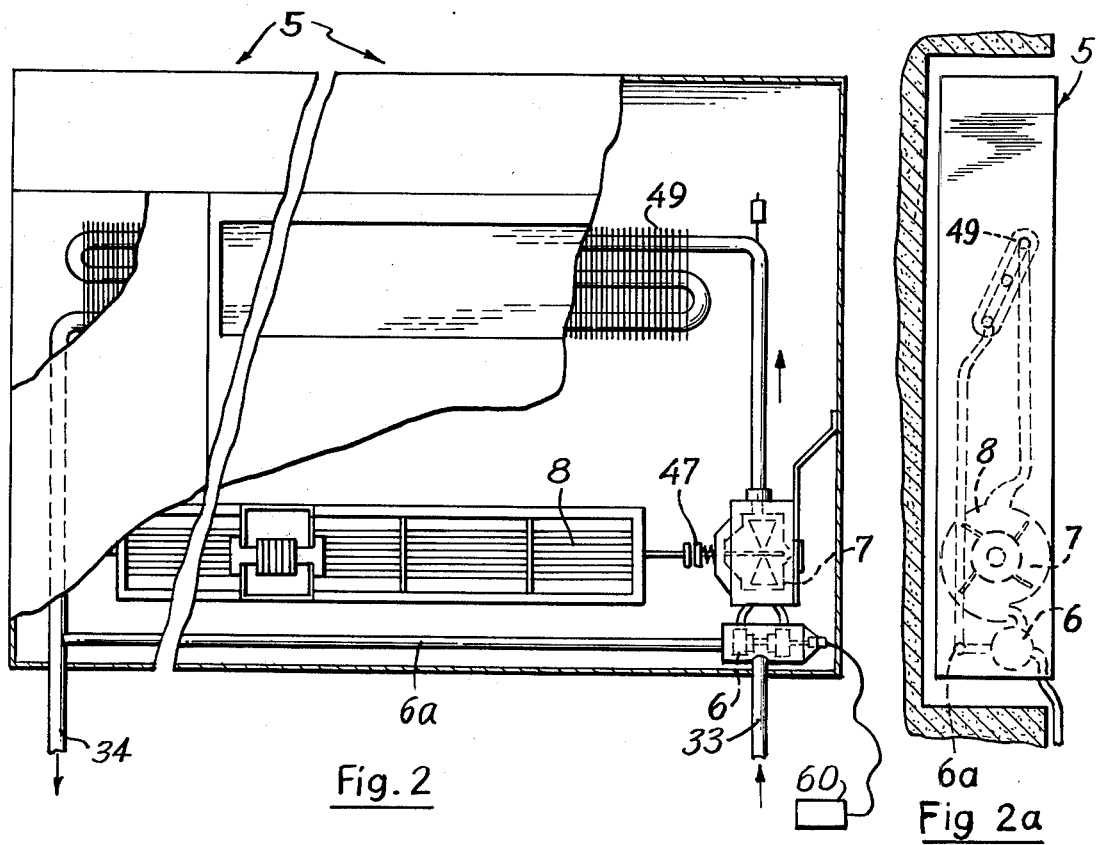

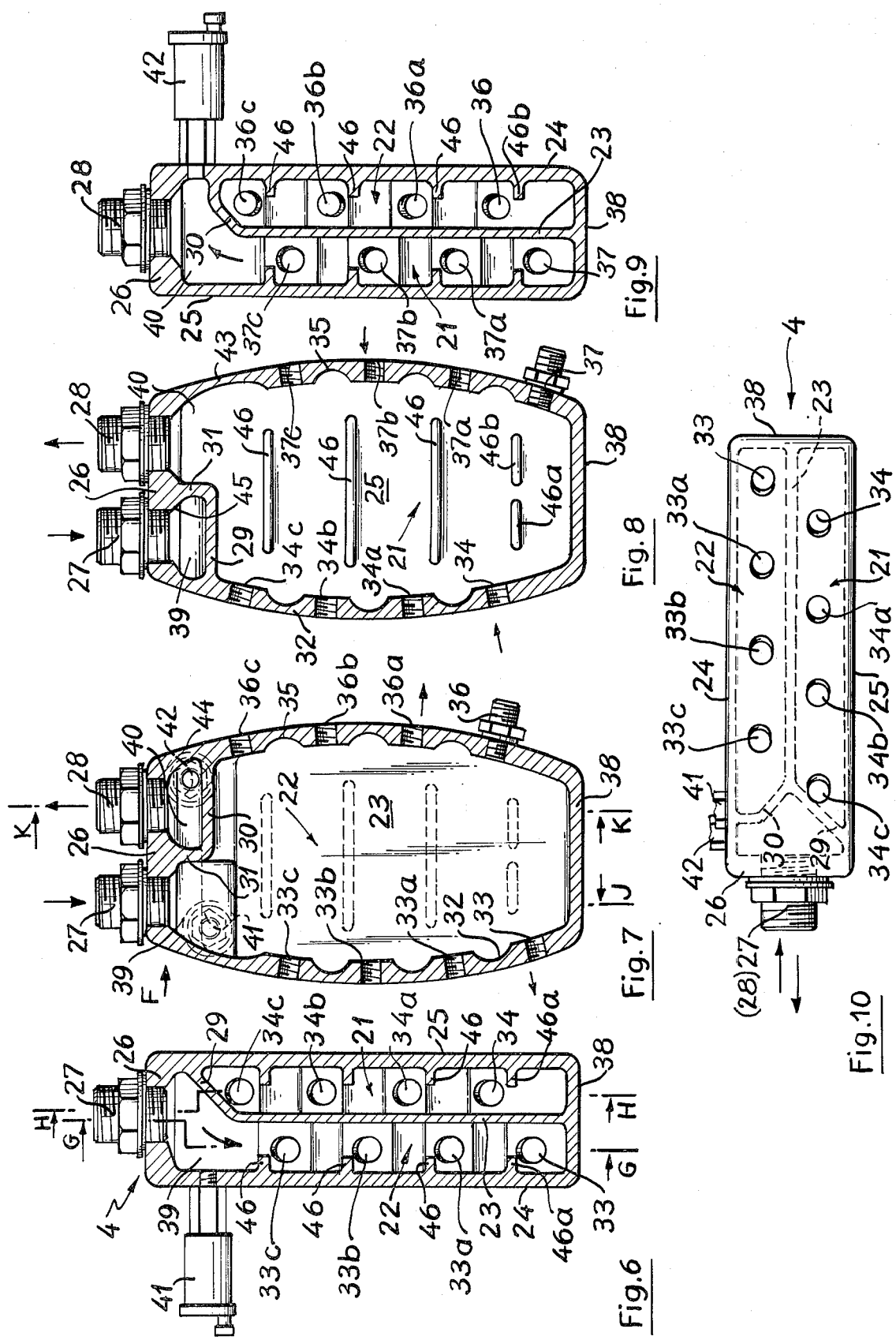

SYSTEM FOR THERMAL EXCHANGERS

The present invention relates to ventilation, heating or cooling systems installed in houses or in industrial buildings. More particularly, it relates to an improved system for increasing the efficiency of already known thermal exchangers constituted of pipes and tubes (provided or not with fins), in which flows a cold or hot fluid which is forced back by a circulation pump from either a heat-generator or a cold-generator.

With such systems, it is common to place in front of a hot or cold radiator a ventilator which is operated by a turbine driven by the fluid circulating therein.

The operation thereof is often disturbed by jerks and by the irregular flow of the fluid due to gas evolved during fluid temperature variations. The greater the temperature regulation is, the more prominent is the above-mentioned disadvantage. Thus, in such systems, it becomes difficult to automatically alternate the central production of heat and cold. Consequently, the individual regulating on each exchanger at will is far from accurate.

The system in accordance with the present invention avoids the above disadvantages by continuously degasifying and regulating the fluid flow whatever its temperature variations may be. It permits greatly improved operation of the turbine and of the other allied temperature regulating devices. In addition, the present system allows the accurate coupling of a so-called regulating-reversing device so designed as to pump either from the hot generator or from the cold generator, according to the external temperature, to a particular device specially adapted for regulating the flow of fluid at each turbine. The latter device which comprises a special gate and a diaphragm greatly improves taps networks commonly used for automatically by-passing a thermal exchanger, owing to the easiness and accuracy in adjusting the same, its simplicity of design and its small overall dimensions. Consequently, other factors affecting each series of exchangers and the specific positioning are taken into account at once.

Finally, the cumbersomeness of each series of exchangers is so reduced as to allow their mounting into a wall.

The system according to the present invention is characterized by the combination of an outstanding degasifying device to a regulating-reversing device and as many flow modulation devices ahead of the turbine as there are exchangers.

A non-restrictive preferred embodiment of the device in accordance with the present invention will hereinafter be given with reference to the drawings which comprise:

FIG. 1 depicts a general view of the system in accordance with the invention;

FIGS. 2 and 2a illustrate a partially sectional front view and a right view, respectively, of the exchanger;

FIG. 3 illustrates a regulating-reversing device;

FIGS. 4 and 4a show two cross-sectional views of the turbine taken respectively across along the axis thereof;

FIGS. 5, 5a and 5b depict three longitudinal cross-sections taken along line F—F which are transversal to line E—E and K—K of a valve used for the thermostatic regulating of the flow of fluid in the turbine;

FIG. 6 is a cross-sectional view of the degasifying device;

FIGS. 7, 8 and 9 show cross-sections of the degasifying device taken along lines G—G, H—H and K—K of FIGS. 6 and 7;

FIG. 10 illustrates an outside view of the degasifying device of FIG. 6.

According to FIG. 1, the circulation pump 1 sucks up fluid either from the heat-generator 2, or from the cold-generator 2a, through a regulating-reversing device 3. The pump 1 forces back the fluid in the degasifying device 4 which gives out the hot or cold fluid towards exchangers 5. The latters comprise a special thermostatic valve 6, a calibrated turbine 7 driving a ventilator 8, a radiator 9 (provided or not with fins) in which flows the fluid from the turbine 7 and a by-pass pipe 6a. The fluids from each exchanger come back into the degasifying device 4 and towards the regulating-reversing device 3. The fluid is then driven back to the generator 2 or 2a.

The following system may be provided with a device 10 which centralizes electrically detected temperatures:

A outside, B inside, C and D in the fluid return paths to generators. According to these data, the device 10 sends orders to generators 2 and 2a (through relays R and R1) and to regulator 3.

The regulating-reversing device 3 (FIG. 3) receives in 11 the hot fluid from 2, and in 12 the cold fluid from 2a. Pipes 11 and 12 lead to each end of a cylindrical body 13, from the middle of which starts a pipe 14 towards the pump 1. Another cylindrical body 15 is in communication, at each end, with the fluid return paths 16 and 17, respectively, towards generators 2 and 2a. In its middle, the body 15 receives in 18 the fluid from the degasifying device 4. In each body (13 or 15) a piston (13a and 15a) is drawn towards the left when cold has to be provided and towards the right when heat has to be provided, from a median position corresponding to the aperture 14a (or 18a). The piston is actuated by a known electro-magnetic device 19 or 20 mounted at the end of a stem integral to the piston on each body 13 or 15. Devices 19 and 20 are electrically connected to the device 10 and act when moved to the left, to obtain a cooling or on movement to the right to distribute heat. Consequently, piston 13a will selectively provide the exchangers with cold or hot fluid, whereas piston 15a will establish the corresponding communication on the return paths towards the generators. The components are housed in a casing 3a.

The special degasifying device 4 (FIGS. 6 to 10) is mounted flat slightly above the floor, preferably at the centre of a room. It gets rid of flow jerks and irregularities. It comprises two compartments, a lower one 21, and an upper one 22, separated by an horizontal partition 23 parallel, on most of its surface, to both of the upper and lower faces 24 and 25 of said device. On the four side-faces, there are successively:

On face 26 (at one end), the inlet aperture 27 from pump 1, and outlet aperture 28 towards pipe 18. The first one leads to the upper chamber 22, the second one to the lower chamber 21. This parting is obtained by means of partitions 29, 30, 31, integral with side 26 and with partition 23.

On the vertical face 32, two series of distribution apertures are provided. One series communicates with the upper chamber 22, then with the pump 1. They are apertures 33, 33a, 33b, etc. communicating with each turbine 7 inlet. The other series corresponds with the lower chamber 21, then with exchangers return (apertures 34, 34a, 34b etc.). The first one is preferably shifted with respect to the second one, in order to facilitate the mounting of joints (FIG. 10).

On the vertical face 35, there are two other series of distribution apertures. The first one (36, 36a, 36b etc.) corresponds with the upper floor 22 and has the same function as apertures 33. The series of apertures 37, 37a, 37b etc. corresponds with the lower floor 21, and completes the series of apertures 34, 34a, etc.

On the vertical face 38 which is used as a bottom, there are no apertures.

Two degasifying chambers 39 and 40 are separated by partitions 23, 29 and 30. One (39) communicates with 22, feeding the exchangers, the other (40) collects returns after chamber 21, each of them possesses in their upper part an automatic air cleanser 41 or 42. They are so shaped as to render degasifying efficient; particularly mouldings are set around the apertures and on the faces, such as those shown in 43, 44, 45. Ribs 46 impose a direction to the fluid flowing in each compartment 21 and 22. The one which is the nearer of the bottom 38 has two parts 46a and 46b, with a passage in its middle. Apertures are made under the compartments 21 and 22, for draining, with special plugs.

FIG. 2 illustrates an example of thermal exchangers 5, together with a centrifugal tangential ventilator 8. Clutch 47 permits ventilation to be suppressed at will. But this summary means is not sufficient to individualize and modulate each heat or cold issuer. First, according to the exposure of each room, an inwardly gauged tube shaped orifice nozzle 48, mounted at the inlet or outlet of the turbine (FIG. 4a), permits the flow to be regulated. Moreover, a four-tracked thermostatic valve 6 permits, according to the room temperature, more or less fluid to be admitted into turbine 7 and into exchanger 49. It is constituted (FIGS. 5 and 5a) by a cylindrical body 50 drilled at its middle (plan E—E) with two diametrically opposite apertures 51 and 52. The first one (51) communicates with one of the pipes (33 or 36 for example) and from the distribution and degasifying device 4. The second one 6a by-passes the turbine and the exchanger. A non-rotary sliding shaft 52 carries two discs 53 and 54 adjusted in the boring of body 50. Between these discs, two segments 55 and 56 are solid with the shaft. They are spaced apart in order to permit communication between 51 and 6a at a middle position of shaft 52. In this position, discs 53 and 54 obturate two apertures 57 and 58, prolonged by a Y-shaped pipe, joining the inlet to the turbine 7.

A thermostatic device, of a bulbed type for example, 59, moves the shaft 52 as a function of the temperature detected in the room, by probe 60. It will be easy to understand that in the body 50, the chamber 61 constantly receives the fluid (the latter is cold or hot according to the desired general climatic conditions). If the room temperature increases too much, shaft 52 moves in the direction of arrow M. By-pass 6a closes up gradually and the cooling fluid (high outside temperature A) is admitted by 57 into the turbine and the exchanger. On the contrary, by cold weather, if the room temperature descreases too much, shaft 52 will slide in the direction of arrow N, admitting the heating fluid in 58. It will be easy to understand that, according to the previous adjusting of the thermostatic set 59–60, an individualized temperature regulation will be obtained in the room. The general conditions given by the regulating-reversing device 3 will then be corrected.

The exchanger system is thin so as to permit its mounting in a wall, as shown in FIG. 2a.

FIG. 4a, shows a possible system for driving ventilator 8 by the turbine wheel 7. In order to reduce air inlets and the sealing thereof to a maximum, driving of the wheel is achieved by a series of magnets 7c (on the wheel side) and 7d (on the ventilator end) separated by a very thin, not magnetic partition 7b which ends body 7a of the turbine.

I claim:

1. In a heat exchange system utilizing hot or cold fluid as a medium, said system including means for changing the temperature of said fluid medium, a plurality of thermal exchangers each including an air ventilator driven by a turbine, pump means for propelling said fluid medium through said thermal exchangers and returning it to said temperature changing means, feed conduit means connecting said pump means with said thermal exchangers, and return conduit means connecting said thermal exchangers with said temperature changing means, the improvement comprising: a single degasifying box connected with said feed conduit means for distributing hot or cold fluid medium to all of said heat exchangers, and connected with said return conduit means to collect the fluid medium from all of said heat exchangers for return to said temperature changing means, said degasifying box functioning to remove gases entrained in said fluid medium before said fluid medium reaches each of said turbines through said feed conduit means.

2. In a heat exchange system as recited in claim 1, wherein said degasifying box includes two separate compartments, one of said compartments being connected with said feed conduit means, and the other of said compartments being connected with said return conduit means, whereby the flow of said fluid medium to said thermal exchangers is separated from the flow of fluid medium from said thermal exchangers.

3. In a heat exchange system utilizing hot or cold fluid as a medium, said system including means for changing the temperature of said fluid medium, a plurality of thermal exchangers each including an air ventilator driven by a turbine, pump means for propelling said fluid medium through said thermal exchangers and returning it to said temperature changing means, feed conduit means connecting said pump means with said thermal exchangers, and return conduit means connecting said thermal exchangers with said temperature changing means, the improvement comprising: a single degasifying box connected with said feed conduit means for distributing hot or cold fluid medium to all of said heat exchangers, and connected with said return conduit means to collect the fluid medium from all of said heat exchangers for return to said temperature changing means, said degasifying box functioning to remove gases entrained in said fluid medium before said fluid medium reaches each of said turbines through said feed conduit means, and including generally parallel main top and bottom surfaces, the interior of said degasifying box being divided by an horizontal partition parallel with said main top and bottom surfaces into an upper compartment, and a separate lower compartment; said upper compartment being connected with said feed conduit means, and said lower compartment being connected with said return conduit means, whereby the flow of said fluid medium to said thermal exchangers is separated from the flow of fluid medium from said thermal exchangers.

4. In a heat exchange system as recited in claim 3, wherein said degasifying box further includes input and output apertures located adjacent each other but separated by walls integral with said horizontal partition, said input aperture being connected to said feed conduit means for receiving fluid medium from said pump means, and said output aperture being connected with said return conduit means to return fluid medium to said temperature changing means.

5. In a heat exchange system as recited in claim 4, wherein said degasifying box further includes a pair of automatic air removers on the said top surface thereof, one of said air removers being connected with said upper compartment, and the other being connected with said lower compartment.

6. In a heat exchange system as recited in claim 5, wherein the interior surfaces of said degasifying box defining said upper compartment and said lower compartment have ribs thereon for properly directing the flow of fluid therewithin.

* * * * *